US007014763B2

(12) United States Patent
Johnson et al.

(10) Patent No.: US 7,014,763 B2
(45) Date of Patent: Mar. 21, 2006

(54) MULTIPLE BARRIER BIOLOGICAL TREATMENT SYSTEMS

(75) Inventors: Lloyd W. Johnson, Roscoe, IL (US); Kenneth A. Mikkelson, Madison, WI (US); Dennis M. Gleason, Redmond, WA (US); Edward W. Lang, Rockton, IL (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 115 days.

(21) Appl. No.: 10/357,084

(22) Filed: Feb. 3, 2003

(65) Prior Publication Data

US 2004/0149653 A1   Aug. 5, 2004

(51) Int. Cl.
*C02F 3/00* (2006.01)

(52) U.S. Cl. ..................................... 210/295
(58) Field of Classification Search ............... 210/295, 210/188
See application file for complete search history.

(56) References Cited

U.S. PATENT DOCUMENTS

| | | | |
|---|---|---|---|
| 4,152,265 A | 5/1979 | Meyers | |
| 4,283,254 A * | 8/1981 | Binau et al. ............ | 203/4 |
| 4,422,771 A | 12/1983 | Earhart | |
| 4,454,034 A | 6/1984 | Astrom | |
| 4,540,487 A | 9/1985 | Johnson | |
| 4,639,315 A | 1/1987 | Fuchs | |
| 4,695,376 A | 9/1987 | Astrom | |
| 4,723,848 A | 2/1988 | Knight | |
| 4,733,972 A | 3/1988 | Weis | |
| 4,764,053 A | 8/1988 | Schupbach | |
| 4,833,602 A | 5/1989 | Levy | |
| 4,883,602 A | 11/1989 | Anderson | |
| 4,956,100 A | 9/1990 | Mikkleson | |
| 4,997,557 A | 3/1991 | Anderson | |
| 5,228,996 A | 7/1993 | Lansdell | |
| 5,282,487 A | 2/1994 | Timpany | |
| 5,358,644 A | 10/1994 | Dennis | |
| 5,362,401 A | 11/1994 | Whetsel | |
| 5,374,360 A | 12/1994 | Weis | |
| 5,876,612 A | 3/1999 | Astrom | |
| 5,942,108 A | 8/1999 | Yang | |

(Continued)

OTHER PUBLICATIONS

Brochure: PALL CORP. Water Processing : Aria Water Treatment Systems (2000, US).

(Continued)

*Primary Examiner*—Chester T. Barry
(74) *Attorney, Agent, or Firm*—Niro, Scavone, Haller & Niro

(57) ABSTRACT

The inventions separate the activated sludge, biochemical reaction stages of the batch treatment process of a sequencing batch reactor from the clarification and sedimentation stages by separating the locations where each process takes place. The separation may be accomplished in a variety of ways including constructing separate basins for each process, installing baffles or other partitions in a single vessel to isolate the areas where each process takes place, or other methods of process separation as are known in the art. In each process, treatment occurs through the performance of a series of operations. The operations are repeated for each batch of wastewater processed by the SBR. In a conventional SBR process, the cycle of operations for clarification and sedimentation are dependent on a preceding biochemical reaction step. However, in the present invention the clarification and sedimentation operations are independent of the biochemical reaction operations. It remains possible to coordinate operations so that the process cycles are coincident, however the benefits of the invention are more readily realized by the practice of independent operation.

12 Claims, 5 Drawing Sheets

U.S. PATENT DOCUMENTS

| | | |
|---|---|---|
| 5,951,878 A | 9/1999 | Astrom |
| 6,019,898 A | 2/2000 | Johnson |
| 6,103,132 A | 8/2000 | Seyfried |
| 6,294,098 B1 | 9/2001 | Bergmann |
| 6,447,617 B1 | 9/2002 | Bergmann |
| 6,485,645 B1 * | 11/2002 | Husain et al. ............... 210/605 |
| 2002/0096472 A1 * | 7/2002 | Smith et al. ................ 210/606 |

OTHER PUBLICATIONS

Selection Guide: PALL CORP. Water Processing: Pall Hollow Fiber Filtration Systems (1999-2002, US).

* cited by examiner

FIG. 5

| TIME | BIOCHEMICAL CYCLE | CLARIFICATION CYCLE |
|---|---|---|
| :05 | FILL | FILL / CLARIFY / DECANT |
| :10 | FILL | FILL / CLARIFY / DECANT |
| :15 | REACT | FILL / CLARIFY / DECANT |
| :20 | REACT | FILL / CLARIFY / DECANT |
| :25 | DRAW | FILL / CLARIFY / DECANT |
| :30 | DRAW | FILL / CLARIFY / DECANT |

FIG. 6A

|  | 0-1 HR | 1-2 HR | 2-3 HR | 3-4 HR | 4-5 HR | 5-6 HR |
|---|---|---|---|---|---|---|
| FILL | X | X | X |  |  |  |
| FILL & REACT | X | X | X |  |  |  |
| REACT | X | X | X | X | X | X |
| REACT & DRAW |  |  |  | X | X | X |
| DRAW |  |  |  | X | X | X |
| DRAW & FILL | X | X | X | X | X | X |

FIG. 6B

|  | 0-1 HR | 1-2 HR | 2-3 HR | 3-4 HR | 4-5 HR | 5-6 HR |
|---|---|---|---|---|---|---|
| FILL | X | X | X | X | X | X |
| FILL / CLARIFY | X | X | X | X | X | X |
| CLARIFY | X | X | X | X | X | X |
| CLARIFY / DECANT | X | X | X | X | X | X |
| DECANT | X | X | X | X | X | X |
| DECANT / FILL | X | X | X | X | X | X |

MULTIPLE BARRIER BIOLOGICAL TREATMENT SYSTEMS

FIELD OF THE INVENTION

The present inventions apply generally to batch mode wastewater treatment processes and systems that employ activated sludge. More specifically, the inventions are directed to enhanced removal of suspended solids and other pollutants from a fluid stream using a modified sequencing batch reactor configuration.

BACKGROUND OF THE INVENTION

When a wastewater treatment facility is designed to employ batch mode influent flow treatment with a sequencing batch reactor (or SBR), the treatment plant operator realizes several advantages over the use of conventional, continuous flow treatment facilities. In an SBR system, a single vessel performs multiple functions over time, thereby placing all the necessary treatment equipment within a smaller footprint, saving the cost of purchasing and maintaining additional land. In addition, both the initial capital costs and the annual operation and maintenance cost for SBR's are ordinarily lower than continuous flow systems since there are fewer vessels to maintain and fewer pieces of equipment to install and operate.

In a basic SBR, the vessel treats a fixed volume of wastewater influent in four phases over time. The first two phases, filling and reacting, occur under dynamic flow conditions in the basin. The influent flows into the basin and is mixed with aerated activated sludge causing a reaction that captures suspended solids. These are commonly referred to as the biochemical reaction phases of the treatment process.

Following biochemical reaction, the final two phases are quiescent periods in the vessel, for clarification and sedimentation. The process of clarification and sedimentation creates an upper liquid zone and a lower solids zone in the reactor. The liquids are decanted from the top of the vessel and a portion of the solids are removed from the bottom. After separation, the liquids and solids are processed separately. In many systems, the liquids are then passed through a filtration system, such as an AquaDisk® Cloth Media Filter, to remove smaller solids that remain suspended after the prior treatment step. Solids are commonly concentrated and stored for later disposal or land application. At the conclusion of the fourth phase the vessel is again ready to treat another volume of the influent.

In a typical SBR, since the reaction and clarification phases occur in the same vessel, the size of the vessel will be selected based on the phase or process step that requires the largest volume, making the basin oversized for the remaining phases. Since aeration is intermittent, the aeration equipment (blowers and diffusers) is commonly over designed to deliver the needed oxygen to the activated sludge within the time allotted for biochemical reaction. The inability to aerate a vessel continuously means that, maximum oxygen utilization rates cannot be accommodated in small reaction tanks.

Each SBR vessel can be "turned down" to some extent so as to be operated at less than its full influent volume capacity. However, the turn down ratio is limited to a fixed fraction of the full volume. Therefore, the larger the vessel size, the greater the initial flow requirement will be for operation in a turned down condition. Turned down operations are particularly important during the initial operation of an SBR. Vessel sizes are normally determined based on projected influent volumes that are expected ten to twenty years into the future. When these SBR vessels are first operated, incoming flows may be lower than the full turned down capacity of the system requiring storage of the influent until the minimum volume is available. By reducing the size of each SBR vessel, smaller incoming flows can be treated.

In normal operation, the water level in an SBR vessel rises and falls with each batch cycle. The rising and falling water line makes it more difficult to remove floatable pollutants like oils and greases (generically referred to as "scum") in comparison to a vessel that operates at a fixed water level. The present inventions overcome these and other limitations of current SBR treatment processes.

It is a feature and an advantage of the present inventions that the reaction phases are separated from the clarification phases by providing separate vessels that operate independently of each other. Such separation—while still operating each vessel in a batch mode—optimizes the vessel volumes for each treatment phase. Optimized volumes result in smaller land footprints, lower construction costs and higher cost effectiveness for SBR systems.

With a separate biochemical reaction vessel, reaction time with the present invention may increase to 24 hours per day. It is a feature and an advantage of the present inventions that this improvement allows for aeration equipment to be reduced in size, thereby reducing equipment and capital cost for SBR systems. It is a further feature and advantage of the present inventions that continuous aeration accommodates maximum oxygen utilization rates (OURs) in smaller tanks than conventional SBR systems.

It is also a feature and advantage of the present inventions that the smaller operating vessels resulting from the implementation of the inventions allow for a greater range of turn down capabilities. Increased turn down ranges allow treatment plant operators to handle initial flows to a new SBR that would be too low to properly treat with a conventional SBR system.

It is also a feature and an advantage of the inventions that, unlike conventional SBR systems, the clarification component of the inventions can operate at a fixed water level to better facilitate scum removal.

SUMMARY OF THE INVENTION

The inventions separate the activated sludge, biochemical reaction stages of batch treatment from the clarification and sedimentation stages by separating the locations where each process takes place. The separation may be accomplished in a variety of ways, including constructing separate basins for each process, installing baffles or other partitions in a single vessel to isolate the areas where each process takes place, or other methods of process separation as are known in the art. Hereafter, where the specification refers to separate biochemical reaction and clarification areas, vessels and the like, it will be understood to be a reference to any form of isolating the location where each treatment process takes place.

In each process, treatment occurs through the performance of a series of operations. The operations are repeated for each batch of wastewater processed by the SBR. In a conventional SBR process, the cycle of operations for clarification and sedimentation are dependent on a preceding biochemical reaction step. However, in the present inventions, the clarification and sedimentation operations are independent of the biochemical reaction operations. It remains possible to coordinate operations so that the process cycles are coincident, however, the full benefits of the invention are more readily realized by the practice of independent operation.

Thus, the inventions provide for enhanced batch mode treatment of municipal, commercial and industrial wastewaters with greater operational flexibility, greater treatment effectiveness, less cost, improved biochemical reaction time and increased oxygen utilization rates, all leading to higher effluent water quality.

Definition of Terms

The following terms are used in the claims of the patent and are intended to have their broadest meaning consistent with the requirements of law:

batch mode—a method of treating wastewater by the conveyance of discrete volumes through a treatment device as opposed to the continuous flow of wastewater through a treatment device;

biochemical reaction—the effect of the combination of activated sludge with a wastewater, usually in the presence of aeration;

biochemical treatment—the removal of pollutants from a wastewater by means of a biochemical reaction;

channel—any structure that conveys a fluid from one location to another, whether in the form of an open conduit, a closed conduit, a weir box, a plenum, a passageway or other similar structure;

clarification—the separation of settleable solids from a liquid medium;

cycle of operation commands—a series of treatment steps that result in the removal of pollutants from a wastewater, or that prepare a wastewater for the subsequent removal of pollutants;

hydraulic gradient—the measure of a water level across a vessel;

multiple barrier—several steps performing functions to meet the desired treatment objective;

vessel—any structure that confines a liquid volume.

Where alternative meanings are possible, the broadest meaning is intended. All words in the claims are intended to be used in the normal, customary usage of grammar and the English language.

BRIEF DESCRIPTION OF THE DRAWINGS

FIG. 5 is a table illustrating typical operating cycles for biochemical reaction and clarification.

FIG. 6A is an index of exemplary operation sequences for a biochemical reactor of the present inventions.

FIG. 6B is an index of exemplary operation sequences for a clarifier according to the present inventions.

DETAILED DESCRIPTION OF THE PREFERRED EMBODIMENTS

Set forth below is a description of what are currently believed to be the preferred embodiments or best examples of the inventions claimed. Future and present alternatives and modifications to these preferred embodiments are contemplated. Any alternatives or modifications which make insubstantial changes in function, in purpose, in structure or in result are intended to be covered by the claims of this patent.

Figure 1:
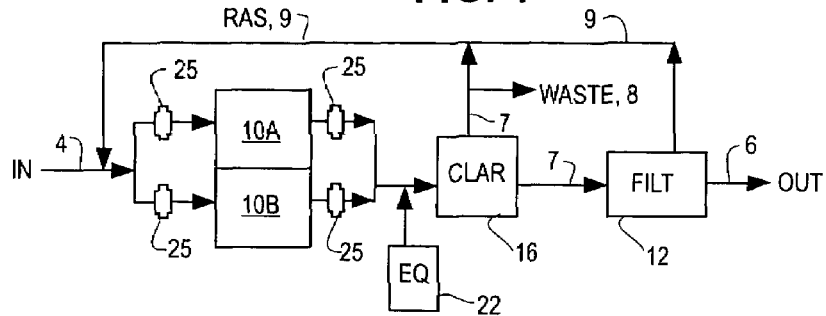
FIG. 1 is a plan schematic diagram of a preferred SBR wastewater treatment system with separated biochemical reaction and clarification vessels followed by filtration.
Figure 2:
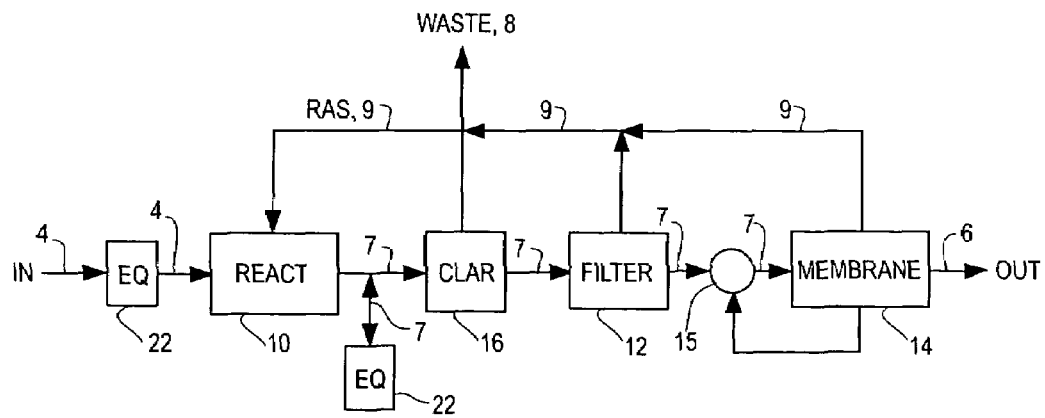
FIG. 2 is a plan schematic diagram of an SBR wastewater treatment system with separated biochemical reaction and clarification vessels of FIG. 1A, followed by filtration and also followed by membrane microfiltration.
Figure 3:
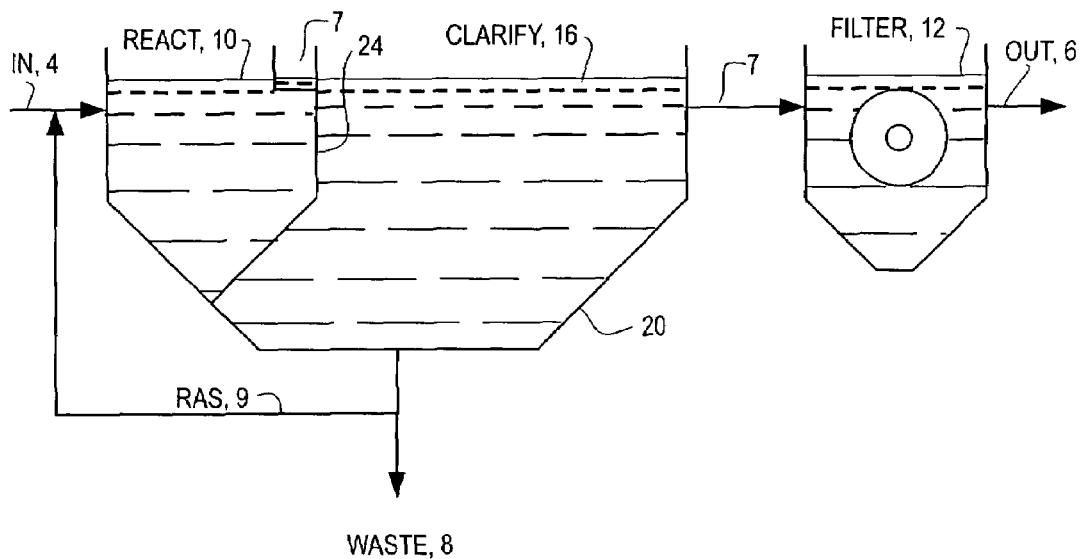
FIG. 3 is an elevational schematic diagram of a preferred SBR wastewater treatment system using a single vessel partitioned to isolate biochemical reaction and clarification processes, followed by filtration.
Figure 3A:
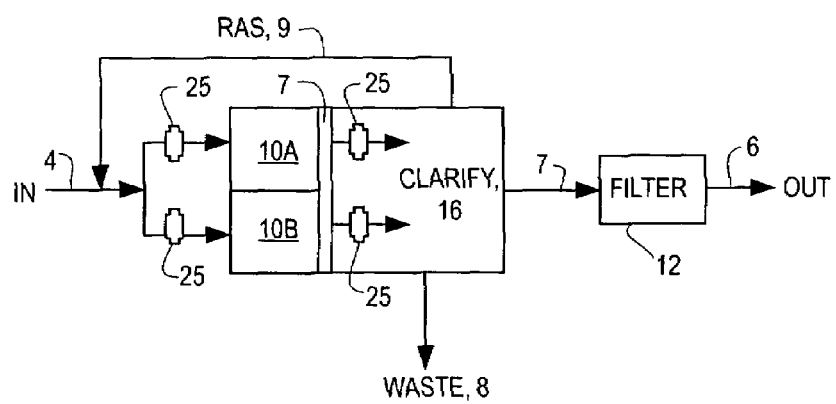
FIG. 3A is a plan schematic diagram of the system of FIG. 3.
Figure 4:
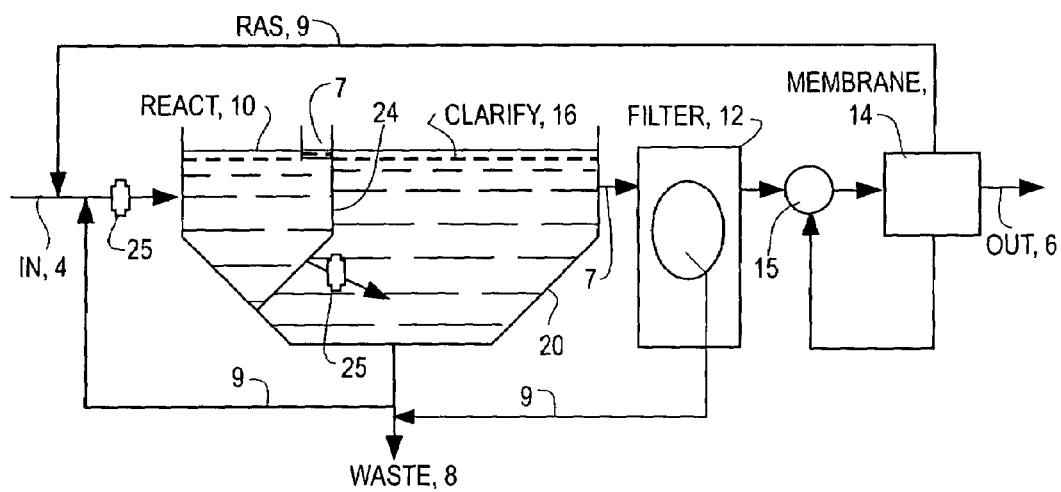
FIG. 4 is an elevational schematic diagram of a preferred SBR wastewater treatment system using a single vessel partitioned to isolate biochemical reaction and clarification processes, followed by filtration and membrane microfiltration.
Figure 4A:
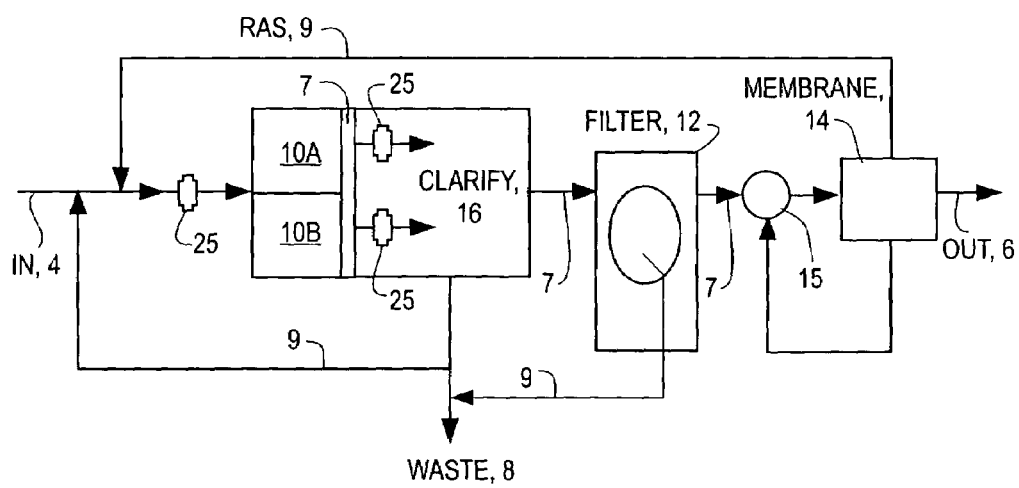
FIG. 4A is a plan schematic diagram of the system of FIG. 4.

FIGS. 1, 3 and 3A show an SBR modified according to one of the preferred embodiments of the present inventions having separate basins for biochemical reaction and clarification, with the biochemical reaction basin 10 also being divided into two biochemical reaction basins 10A and 10B. The influent can be a raw wastewater influent, but is more commonly the effluent from a previous treatment step such as screening, chemical conditioning or other primary treatment processes as are known in the art. The influent channel 4 conveys the wastewater into a biochemical reaction basins 10A and 10B. It will be understood that a single biochemical reaction basin 10 (see FIGS. 1A and 2), or more than two biochemical reaction basins (not shown) 10A and 10B, may be used as part of the present inventions, depending upon design parameters and the like. However, for simplicity, the majority of the references to the biochemical basin 10 herein will be by reference to basins 10A and 10B.

Figure 1A:
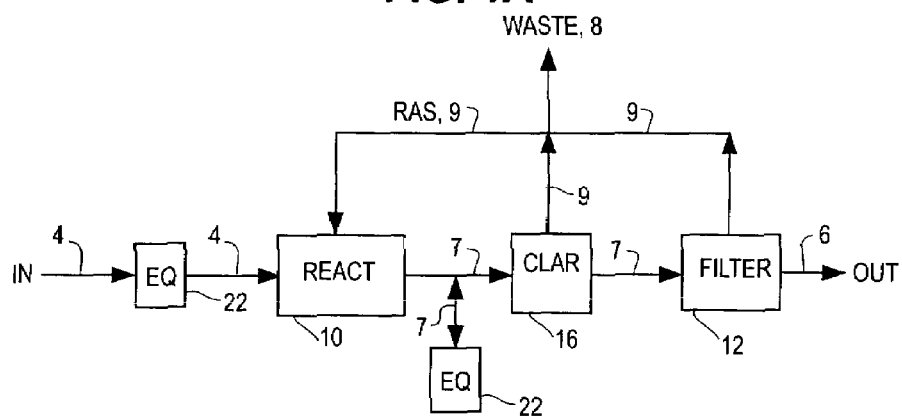
FIG. 1A is a plan schematic diagram of an alternate SBR wastewater treatment system with separated biochemical reaction and clarification vessels followed by filtration and having a single reaction basin and associated equalization basin.

A source of activated sludge is conveyed to the biochemical reaction basins 10A and 10B, in this example by a separate return activated sludge channel 9 and control means 26. It is also within the scope of the inventions for the activated sludge to be combined with the influent prior to being introduced into the biochemical reaction basins 10A and 10B. Under either option, flow measurement and control means 25, including any combination of pumps, valves, orifices, gates, bubblers, level sensors and other devices as are known in the art, fill the biochemical reaction basins 10A and 10B with influent and activated sludge to a predetermined water level or for a predetermined time. For example, when the desired water level or preset time is reached, inflow stops, ending the "fill" cycle for the biochemical reaction basin 10A. Biochemical reaction basin 10B then initiates a "fill" cycle. In the case of a single biochemical reaction basin 10, such as shown in FIGS. 1A and 2, when the desired water level or preset time is reached, inflow stops, ending the "fill" cycle for biochemical reaction basin 10. The equalization basin 22 continues to receive the incoming flow for subsequent batch processing.

A static or mechanical mixing means from among those that are known in the art for the mixing of wastewater may be present in the biochemical reaction basin 10 to integrate the influent with the activated sludge thereby creating a mixed liquor. The mixed liquor is aerated to increase the available oxygen in the biomass and promote the interaction of the biomass with the suspended solids of the influent. The biomass reacts with the suspended solids to accomplish the capture of those suspended solids for later removal in the clarification basin 16. The duration of the mixing and aeration is controlled by either timing means or by the measurement of a characteristic of the mixed liquor, such as dissolved oxygen concentration or the oxidation reduction potential. When a target time is reached or a measured characteristic is met, the "react" phase of the batch treatment is complete.

Upon the completion of the react phase, the mixed liquor is drawn from the biochemical reaction basin 10 and conveyed by a transfer channel 7 to a clarification basin 16. As the mixed liquor is drawn from the biochemical reaction basin 10 the water level in the basin falls. When the water level in the reaction basin reaches a predetermined level, the "draw" phase of the batch treatment is complete. From the clarification basin 16, the effluent flows to filtration basin 12.

As is known in the art, the filtration basin 12 may be comprised of any kind of cloth media filter such as, preferably, the AquaDisk® line of filters or various other filtration systems as are known in the art. Solids retained in the filtration basin 12 can be returned to the biochemical reaction basins 10A and 10B via return channel 9 or disposed as waste solids via waste channel 8. The effluent from the filtration basin 12 is discharged through an effluent channel 6. Alternative embodiments, FIGS. 2, 4, 4A and 8, show processes whereby the effluent from the filtration basin 12 can be conveyed to a microfiltration basin 14 via a transfer channel 7. The microfiltration basin 14 (typically including a pump reservoir 15) may be comprised of membrane filters such as those available from a wide variety of manufacturers and as are known in the art for the removal of solids with particle sizes under ten microns. Retentate from the microfiltration process is returned to pump reservoir 15 via a retentate channel 11. The filtrate is discharged through an effluent channel 6.

While the operation cycle for the biochemical reaction basin 10 has been described as the sequence of fill, react, and draw. It is recognized that any two of the operations can also occur simultaneously. Thus, the range of operation commands also include fill/react, react/draw, and draw/fill. Similarly, the operation cycle for the clarification basin 16 includes not only the fill, clarify and decant phases, but also fill/clarify, clarify/decant and decant/fill. FIGS. 6A and 6B identify several, non-limiting, exemplary operational cycles respectively for the biochemical reaction basin 10 and the clarification basin 16 of the preferred embodiments.

Separating the locations where the batch processes take place allows an operator of the systems described herein greater flexibility. The fill/react/draw phases of the biochemical reaction basin 10 can be operated independently of the fill/clarify/decant phases of the clarification basin 16. FIG. 5 shows a non-limiting table of exemplary biochemical reaction cycles and clarification cycles in comparison to the time during which each cycle occurs. The optional addition of an equalization basin 22 in the processes of FIGS. 1 and 2 provides a temporary detention zone for mixed liquor that is drawn from the biochemical reaction basin during a time in the treatment cycle when the clarification basin 16 is not filling.

In another embodiment of the inventions, the biochemical reaction basins 10A and 10B and the clarification basin 16 are contained within a single, larger vessel. FIGS. 3, 3A, 4 and 4A show a bioreactor separator 20 within which both basins are operated. The biochemical reaction basins 10A and 10B are separated from the clarification basin 16 by a baffle 24 or similar structure as is known in the art. The biochemical reaction basins 10A and 10B include a transfer channel 7 that collects mixed liquor and discharge control 25 permits the control of fluid flow to the clarification basin 16. As in the embodiments of FIGS. 1 and 2, the effluent from the clarification basin 16 is permitted by control means 27 and can be conveyed to a filtration basin 12 and a microfiltration basin 14 for multiple barrier enhanced treatment prior to discharge.

Figure 7:
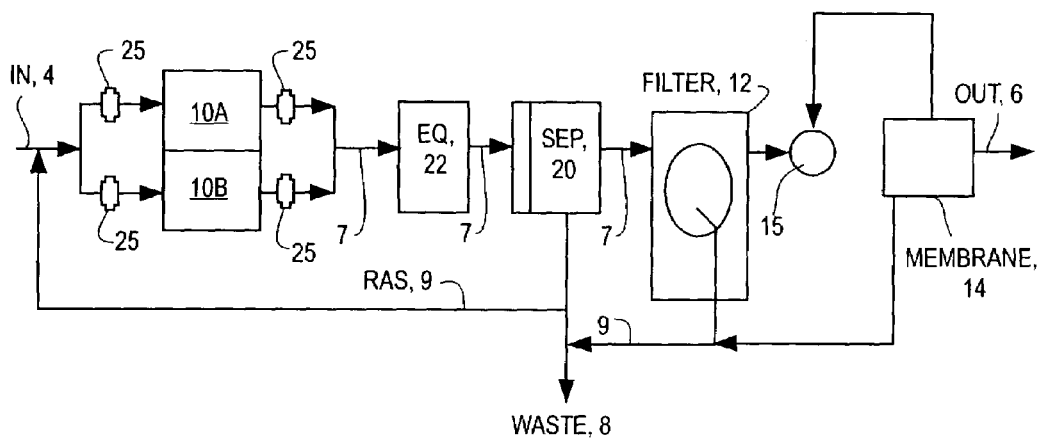
FIG. 7 is a plan schematic diagram of an SBR wastewater treatment system with separated biochemical reaction and separator vessels followed by filtration and membrane microfiltration.
Figure 7A:
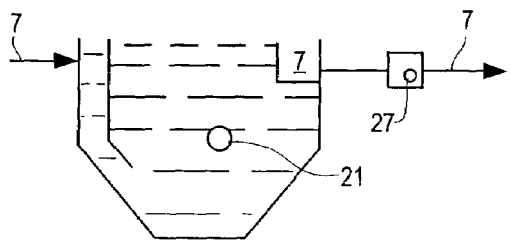
FIG. 7A is an elevational schematic diagram of the solids separator of the system of FIG. 7.

In another embodiment of the inventions, the clarification basin 16 and control means 27 of FIGS. 1–4 is replaced with a solids separator 21 (FIG. 7). In FIG. 7, transfer channels 7 and control means 25 route mixed liquor from the biochemical reaction basins 10A and 10B to the baffled inlet side of solids separator 21. The decanted effluent from the clarification side of the solids separator 21 is permitted by control means 27 and can be conveyed to a filtration basin 12 and a microfiltration basin 14 before being discharged through the effluent channel 6.

Figure 8A:
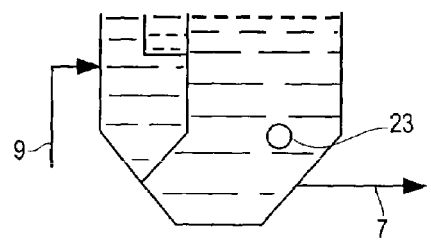
FIG. 8A is an elevational schematic diagram of the phase separator of FIG. 8.
Figure 8:
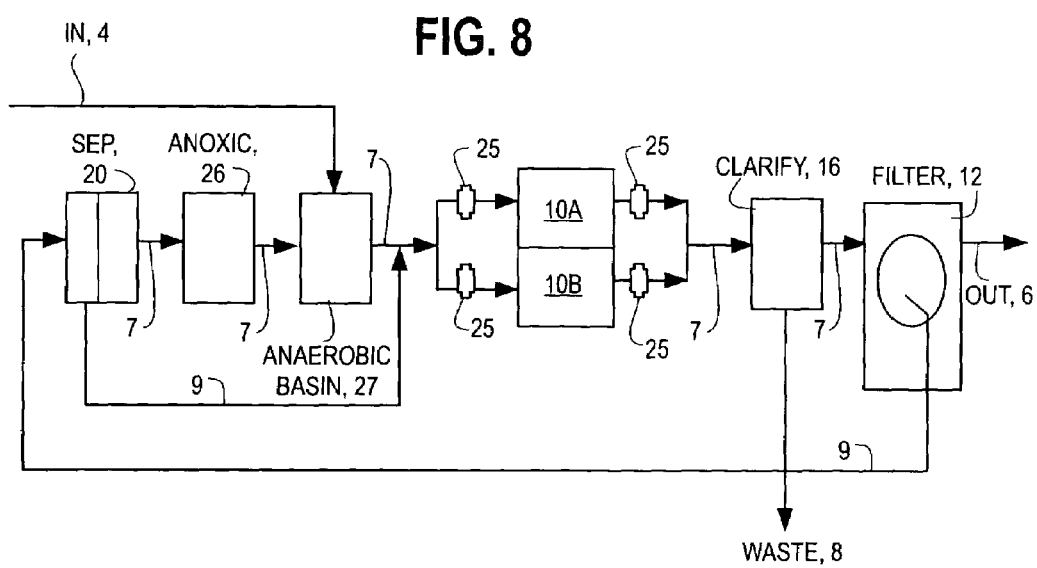
FIG. 8 is a plan schematic diagram for an enhanced nutrient removal process for one embodiment of the present inventions.

In another embodiment of the inventions, a phase separator 23 (FIG. 8) precedes the SBR process of FIGS. 1–4. In FIG. 8, the wastewater influent is conveyed by influent channel 4 to an anaerobic basin 29, as a precursor to treatment by the systems of, for example, FIGS. 1 and 3. This configuration also provides an alternative source of partially clarified activated sludge or mixed liquor for the biochemical reaction basins 10A and 10B from transfer channel 7 to a return channel 9 running from the phase separator 23 to the biochemical reaction basins 10A and 10B. Underflow from the phase separator 23 continues on to anoxic reactor 28. The discharge from anoxic reactor 28 and combines with the influent flow in anaerobic basin 29. The phase separator 23 may preferably be of the general type described in U.S. Pat. No. 5,942,108, which is incorporated herein by reference.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. An activated sludge wastewater treatment system comprising:
   a biochemical reaction vessel containing an aerobic mixed liquor;
   a phase separator in fluid communication with said biochemical reaction vessel, said phase separator receiving an aerobic mixed liquor as an influent;
   a cloth media filter in fluid communication with said phase separator; and
   a membrane filter in fluid communication with said cloth media filter.

2. The treatment system of claim 1, further comprising an equalization basin in fluid communication with said biochemical reaction vessel and also in fluid communication with said phase separator.

3. The treatment system of claim 2, wherein said cloth media filter retains solids as small as ten microns and said membrane filter retains solids as small as 0.1 microns.

4. The treatment system of claim 1, wherein said cloth media filter retains solids as small as ten microns and said membrane filter retains solids as small as 0.1 microns.

5. The treatment system of claim 4, wherein said biochemical reactor is operated in a batch mode.

6. The treatment system of claim 1, wherein said biochemical reactor is operated in a batch mode.

7. An activated sludge wastewater treatment system comprising:
   a biochemical reaction vessel containing an aerobic mixed liquor;
   a clarifier in fluid communication with said biochemical reaction vessel which receives an effluent from said biochemical reaction vessel;
   a cloth media filter in fluid communication with said clarifier;
   a phase separator in fluid communication with said biochemical reaction vessel;
   an anoxic vessel in fluid communication with said phase separator which receives a clarified effluent from said phase separator; and
   an anaerobic vessel in fluid communication with said anoxic vessel which receives the effluent of said anoxic vessel.

8. The treatment system of claim 7, further comprising a membrane filter in fluid communication with said cloth media filter.

9. The treatment system of claim 8, wherein said cloth media filter retains solids as small as ten microns and said membrane filter retains solids as small as 0.1 microns.

10. The treatment system of claim 8, wherein said biochemical reactor is operated in a batch mode.

11. The treatment system of claim 7, wherein said biochemical reactor is operated in a batch mode.

12. The treatment system of claim 7, wherein said cloth media filter retains solids as small as ten microns.

* * * * *